(12) United States Patent
Dutta

(10) Patent No.: US 11,539,554 B2
(45) Date of Patent: Dec. 27, 2022

(54) COMMUNICATION BASED ON VARIABLE-SIZED LOCAL AREA NETWORK IDENTIFIERS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/003,416

(22) Filed: Aug. 26, 2020

(65) Prior Publication Data

US 2022/0070024 A1 Mar. 3, 2022

(51) Int. Cl.
*H04L 12/46* (2006.01)
*H04L 69/22* (2022.01)
*H04L 101/663* (2022.01)

(52) U.S. Cl.
CPC ...... *H04L 12/4675* (2013.01); *H04L 12/4633* (2013.01); *H04L 12/4645* (2013.01); *H04L 69/22* (2013.01); *H04L 2101/663* (2022.05)

(58) Field of Classification Search
CPC ............. H04L 12/4675; H04L 12/4633; H04L 12/4645; H04L 61/6063; H04L 69/22; H04L 12/4641; H04L 2101/663
See application file for complete search history.

(56) References Cited

U.S. PATENT DOCUMENTS 8,923,297 B1 * 12/2014 Daniel ................ H04L 12/4645
370/395.31
2010/0202508 A1 * 8/2010 Karaoguz .............. H04N 19/61
375/E7.002

(Continued)

FOREIGN PATENT DOCUMENTS

EP 3547624 A1 10/2019

OTHER PUBLICATIONS

Mahalingham, M. et al., "Virtual eXtensible Local Area Network (VXLAN): A Framework for Overlaying Virtualized Layer 2 Networks over Layer 3 Networks," Independent Submission; RFC 7348, Aug. 2014, 22 pages.

(Continued)

*Primary Examiner* — Mohamed A. Wasel
(74) *Attorney, Agent, or Firm* — Tong, Rea, Bentley & Kim, LLC

(57) ABSTRACT

Various example embodiments for supporting communications for a network (e.g., a local area network (LAN), a virtual LAN (VLAN), or the like) based on use of an identifier of the network are presented. Various example embodiments for supporting communications for a VLAN based on use of a VLAN identifier (VID) of the VLAN are presented. Various example embodiments for supporting communications of a VLAN based on use of a VID of the VLAN may be configured to support use of a variable sized encoding of the VID (denoted herein as an xVID). Various example embodiments for supporting communications of a VLAN based on use of an xVID for the VLAN may be configured to support use of an xVID that is encoded using a set of fixed-sized identifier units where a number of fixed-sized identifier units used to encode the VID in the xVID is based on the VID.

20 Claims, 8 Drawing Sheets

(56) References Cited

U.S. PATENT DOCUMENTS

| | | | | |
|---|---|---|---|---|
| 2014/0169215 | A1* | 6/2014 | Rajendran | H04L 12/28 370/254 |
| 2015/0207671 | A1 | 7/2015 | Farkas et al. | |
| 2016/0094367 | A1* | 3/2016 | Qu | H04L 12/4641 370/270 |
| 2017/0195260 | A1* | 7/2017 | Ma | H04L 45/7453 |
| 2017/0359255 | A1* | 12/2017 | Manghirmalani | H04L 43/20 |
| 2020/0064797 | A1 | 2/2020 | Hannon et al. | |

OTHER PUBLICATIONS

Garg, P., et al., "NVGRE: Network Virtualization Using Generic Routing Encapsulation," Independent Submission, RFC 7637, Sep. 2015, 17 pages.

Gross, J., et al., "Geneve: Generic Network Virtualization Encapsulation," draft-ietf-nvo3-geneve-16, Network Working Group, Mar. 7, 2020, 37 pages.

Worster, T., et al., "Encapsulating MPLS in IP or Generic Routing Encapsulation (GRE)," Network Working Group, RFC 4023, Mar. 2005, 14 pages.

Xu, X., et al., "Encapsulating MPLS in UDP," Internet Engineering Task Force (IETF), RFC 7510, Apr. 2015, 19 pages.

Ruffen, D., et al., "Cabletron's SecureFast VLAN Operational Model," Version 1.8, Network Working Group, RFC 2643, Aug. 1999, 60 pages.

IEEE, "802.1Q—Virtual LANs," printed from http://www.ieee802.org/1/pages/802.1Q.html on Aug. 26, 2020, 2 pages.

IEEE, "802.1ad—Provider Bridges," printed from http://www.ieee802.org/1/pages/802.1ad.html on Aug. 26, 2020, 4 pages.

IEEE, "802.1ah—Provider Backbone Bridges," printed from http://www.ieee802.org/1/pages/802.1ah.html on Aug. 26, 2020, 6 pages.

IEEE, "802.1aq—Shortest Path Bridging," printed from http://www.ieee802.org/1/pages/802.1aq.html on Aug. 26, 2020, 6 pages.

IEEE, "802.1D—MAC Bridges," printed on http://www.ieee802.org/1/pages/802.1D.html on Aug. 26, 2020, 1 page.

IEEE, "802.1w—Rapid Reconfiguration of Spanning Tree," printed from http://www.ieee802.org/1/pages/802.1w.html on Aug. 26, 2020, 2 pages.

IEEE, "802.1s—Multiple Spanning Trees," printed from http://www.ieee802.org/1/pages/802.1s.html on Aug. 26, 2020, 1 page.

EP Office Action mailed in Corresponding Application No. 21182092.3 dated Dec. 2, 2021, 6 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       TPID            | PCP |D|     VID Unit 1        |VID|
+-+-+-+-+-+-+-+-+-+-+-+-+-+-+-+-+-+-+-+-+-+-+-+-+-+-+-+-+-+-+-+-+
|..Unit 2   |   VID Unit 3    |   VID Unit 4    |   VID Unit 5    |VID|
+-+-+-+-+-+-+-+-+-+-+-+-+-+-+-+-+-+-+-+-+-+-+-+-+-+-+-+-+-+-+-+-+
~                                                                ~
+-+-+-+-+-+-+-+-+-+-+-+-+-+-+-+-+-+-+-+-+-+-+-+-+-+-+-+-+-+-+-+-+
~ VID Unit N-3  |  VID Unit N-2  |  VID Unit N-1  |  VID Unit N   |
+-+-+-+-+-+-+-+-+-+-+-+-+-+-+-+-+-+-+-+-+-+-+-+-+-+-+-+-+-+-+-+-+
```

```
 0 1 2 3 4 5 6 7
+-+-+-+-+-+-+-+-+
|    Value    |N|
+-+-+-+-+-+-+-+-+
```

COMMUNICATION BASED ON VARIABLE-SIZED LOCAL AREA NETWORK IDENTIFIERS

TECHNICAL FIELD

Various example embodiments relate generally to communication systems and, more particularly but not exclusively, to use of various identifiers for supporting communications via communication networks.

BACKGROUND

In communication systems, various identifiers may be used to support communications between various elements of the communication systems.

SUMMARY

In at least some example embodiments, an apparatus includes at least one processor and at least one memory including a set of instructions, wherein the set of instructions is configured to, when executed by the at least one processor, cause the apparatus to support communication of a packet including an encoding of a local area network identifier of a local area network, wherein the encoding of the local area network identifier has a size that is based on the local area network identifier, wherein the encoding of the local area network identifier is based on a set of identifier units. In at least some example embodiments, the set of identifier units includes one or more fixed-sized identifier units. In at least some example embodiments, a number of identifier units in the set of identifier units is based on the local area network identifier. In at least some example embodiments, for each of the identifier units in the set of identifier units, the respective identifier unit includes a first set of bits encoding a respective portion of the local area network identifier and a second set of bits indicative as to whether the respective identifier unit is a final identifier unit in the set of identifier units. In at least some example embodiments, the first set of bits includes seven bits and the second set of bits includes one bit. In at least some example embodiments, each of the identifier units in the set of identifier units has a size of one byte. In at least some example embodiments, the set of identifier units includes at least two identifier units, wherein the local area network identifier is encoded across the at least two identifier units in host byte order. In at least some example embodiments, the encoding of the local area network identifier of the local area network is included within a local area network tag. In at least some example embodiments, the local area network tag includes a tag protocol identifier, a priority code point, and a drop eligible indicator. In at least some example embodiments, the tag protocol identifier is configured to indicate that the packet includes a variable-sized encoding of the local area network identifier. In at least some example embodiments, to support communication of the packet including the encoding of the local area network identifier of the local area network, the set of instructions is configured to, when executed by the at least one processor, cause the apparatus to receive an original packet, insert the encoding of the local area network identifier of the local area network within the original packet to form the packet, and transmit the packet including the encoding of the local area network identifier of the local area network. In at least some example embodiments, to support communication of the packet including the encoding of the local area network identifier of the local area network, the set of instructions is configured to, when executed by the at least one processor, cause the apparatus to receive the packet including the encoding of the local area network identifier of the local area network, remove the encoding of the local area network identifier of the local area network from the packet to form a modified packet, and transmit the modified packet. In at least some example embodiments, to support communication of the packet including the encoding of the local area network identifier of the local area network, the set of instructions is configured to, when executed by the at least one processor, cause the apparatus to generate, based on the local area network identifier, the encoding of the local area network identifier of the local area network. In at least some example embodiments, to generate the encoding of the local area network identifier of the local area network, the set of instructions is configured to, when executed by the at least one processor, cause the apparatus to determine, based on the local area network identifier, a number of identifier units in the set of identifier units to be used to encode the local area network identifier and encode, within the set of identifier units based on the number of identifier units and one or more properties of the set of identifier units, the local area network identifier. In at least some example embodiments, the one or more properties of the set of identifier units includes an identifier unit size of each of the identifier units in the set of identifier units. In at least some example embodiments, to generate the encoding of the local area network identifier of the local area network, the set of instructions is configured to, when executed by the at least one processor, cause the apparatus to determine a number of bits n in an available identifier unit available for use in the set of identifier units, determine a maximum value supportable by the available identifier unit based on n−1 raised to a power of two, determine a number of identifier units for the set of identifier units based on a division of the local area network identifier by the maximum value supportable by the available identifier unit and based on a modulo operation of the local area network identifier by the maximum value supportable by the available identifier unit, determine a number of bits for the encoding of the local area network identifier of the local area network based on a multiplication of the number of identifier units for the set of identifier units and the number of bits n in the available identifier unit, create a data structure for the encoding of the local area network identifier of the local area network, wherein the data structure has a size equal to the number of bits for the encoding of the local area network identifier of the local area network, and generate the encoding of the local area network identifier of the local area network based on reading of a set of bits of the local area network identifier of the local area network into the data structure. In at least some example embodiments, the encoding of the local area network identifier is a variable-sized encoding. In at least some example embodiments, the local area network includes a virtual local area network. In at least some example embodiments, the virtual local area network is supported based on a bridging network, a provider bridged network, a provider backbone bridged network, a shortest path bridging network, or a network virtualization overlay network.

In at least some example embodiments, a non-transitory computer-readable medium stores a set of instructions configured to cause an apparatus to support communication of a packet including an encoding of a local area network identifier of a local area network, wherein the encoding of the local area network identifier has a size that is based on the local area network identifier, wherein the encoding of the local area network identifier is based on a set of identifier units. In at least some example embodiments, the set of identifier units includes one or more fixed-sized identifier units. In at least some example embodiments, a number of identifier units in the set of identifier units is based on the local area network identifier. In at least some example embodiments, for each of the identifier units in the set of identifier units, the respective identifier unit includes a first set of bits encoding a respective portion of the local area network identifier and a second set of bits indicative as to whether the respective identifier unit is a final identifier unit in the set of identifier units. In at least some example embodiments, the first set of bits includes seven bits and the second set of bits includes one bit. In at least some example embodiments, each of the identifier units in the set of identifier units has a size of one byte. In at least some example embodiments, the set of identifier units includes at least two identifier units, wherein the local area network identifier is encoded across the at least two identifier units in host byte order. In at least some example embodiments, the encoding of the local area network identifier of the local area network is included within a local area network tag. In at least some example embodiments, the local area network tag includes a tag protocol identifier, a priority code point, and a drop eligible indicator. In at least some example embodiments, the tag protocol identifier is configured to indicate that the packet includes a variable-sized encoding of the local area network identifier. In at least some example embodiments, to support communication of the packet including the encoding of the local area network identifier of the local area network, the set of instructions is configured to cause the apparatus to receive an original packet, insert the encoding of the local area network identifier of the local area network within the original packet to form the packet, and transmit the packet including the encoding of the local area network identifier of the local area network. In at least some example embodiments, to support communication of the packet including the encoding of the local area network identifier of the local area network, the set of instructions is configured to cause the apparatus to receive the packet including the encoding of the local area network identifier of the local area network, remove the encoding of the local area network identifier of the local area network from the packet to form a modified packet, and transmit the modified packet. In at least some example embodiments, to support communication of the packet including the encoding of the local area network identifier of the local area network, the set of instructions is configured to cause the apparatus to generate, based on the local area network identifier, the encoding of the local area network identifier of the local area network. In at least some example embodiments, to generate the encoding of the local area network identifier of the local area network, the set of instructions is configured to cause the apparatus to determine, based on the local area network identifier, a number of identifier units in the set of identifier units to be used to encode the local area network identifier and encode, within the set of identifier units based on the number of identifier units and one or more properties of the set of identifier units, the local area network identifier. In at least some example embodiments, the one or more properties of the set of identifier units includes an identifier unit size of each of the identifier units in the set of identifier units. In at least some example embodiments, to generate the encoding of the local area network identifier of the local area network, the set of instructions is configured to cause the apparatus to determine a number of bits n in an available identifier unit available for use in the set of identifier units, determine a maximum value supportable by the available identifier unit based on n−1 raised to a power of two, determine a number of identifier units for the set of identifier units based on a division of the local area network identifier by the maximum value supportable by the available identifier unit and based on a modulo operation of the local area network identifier by the maximum value supportable by the available identifier unit, determine a number of bits for the encoding of the local area network identifier of the local area network based on a multiplication of the number of identifier units for the set of identifier units and the number of bits n in the available identifier unit, create a data structure for the encoding of the local area network identifier of the local area network, wherein the data structure has a size equal to the number of bits for the encoding of the local area network identifier of the local area network, and generate the encoding of the local area network identifier of the local area network based on reading of a set of bits of the local area network identifier of the local area network into the data structure. In at least some example embodiments, the encoding of the local area network identifier is a variable-sized encoding. In at least some example embodiments, the local area network includes a virtual local area network. In at least some example embodiments, the virtual local area network is supported based on a bridging network, a provider bridged network, a provider backbone bridged network, a shortest path bridging network, or a network virtualization overlay network.

In at least some example embodiments, a method includes supporting communication of a packet including an encoding of a local area network identifier of a local area network, wherein the encoding of the local area network identifier has a size that is based on the local area network identifier, wherein the encoding of the local area network identifier is based on a set of identifier units. In at least some example embodiments, the set of identifier units includes one or more fixed-sized identifier units. In at least some example embodiments, a number of identifier units in the set of identifier units is based on the local area network identifier. In at least some example embodiments, for each of the identifier units in the set of identifier units, the respective identifier unit includes a first set of bits encoding a respective portion of the local area network identifier and a second set of bits indicative as to whether the respective identifier unit is a final identifier unit in the set of identifier units. In at least some example embodiments, the first set of bits includes seven bits and the second set of bits includes one bit. In at least some example embodiments, each of the identifier units in the set of identifier units has a size of one byte. In at least some example embodiments, the set of identifier units includes at least two identifier units, wherein the local area network identifier is encoded across the at least two identifier units in host byte order. In at least some example embodiments, the encoding of the local area network identifier of the local area network is included within a local area network tag. In at least some example embodiments, the local area network tag includes a tag protocol identifier, a priority code point, and a drop eligible indicator. In at least some example embodiments, the tag protocol identifier is configured to indicate that the packet includes a variable-sized encoding of the local area network identifier. In at least some example embodiments, supporting communication of the packet including the encoding of the local area network identifier of the local area network includes receiving an original packet, inserting the encoding of the local area network identifier of the local area network within the original packet to form the packet, and transmitting the packet including the encoding of the local area network identifier of the local area network. In at least some example embodiments, supporting communication of the packet including the encoding of the local area network identifier of the local area network includes receiving the packet including the encoding of the local area network identifier of the local area network, removing the encoding of the local area network identifier of the local area network from the packet to form a modified packet, and transmitting the modified packet. In at least some example embodiments, supporting communication of the packet including the encoding of the local area network identifier of the local area network includes generating, based on the local area network identifier, the encoding of the local area network identifier of the local area network. In at least some example embodiments, generating the encoding of the local area network identifier of the local area network includes determining, based on the local area network identifier, a number of identifier units in the set of identifier units to be used to encode the local area network identifier and encoding, within the set of identifier units based on the number of identifier units and one or more properties of the set of identifier units, the local area network identifier. In at least some example embodiments, the one or more properties of the set of identifier units includes an identifier unit size of each of the identifier units in the set of identifier units. In at least some example embodiments, generating the encoding of the local area network identifier of the local area network includes determining a number of bits n in an available identifier unit available for use in the set of identifier units, determining a maximum value supportable by the available identifier unit based on n−1 raised to a power of two, determining a number of identifier units for the set of identifier units based on a division of the local area network identifier by the maximum value supportable by the available identifier unit and based on a modulo operation of the local area network identifier by the maximum value supportable by the available identifier unit, determining a number of bits for the encoding of the local area network identifier of the local area network based on a multiplication of the number of identifier units for the set of identifier units and the number of bits n in the available identifier unit, creating a data structure for the encoding of the local area network identifier of the local area network, wherein the data structure has a size equal to the number of bits for the encoding of the local area network identifier of the local area network, and generating the encoding of the local area network identifier of the local area network based on reading of a set of bits of the local area network identifier of the local area network into the data structure. In at least some example embodiments, the encoding of the local area network identifier is a variable-sized encoding. In at least some example embodiments, the local area network includes a virtual local area network. In at least some example embodiments, the virtual local area network is supported based on a bridging network, a provider bridged network, a provider backbone bridged network, a shortest path bridging network, or a network virtualization overlay network.

In at least some example embodiments, an apparatus includes means for supporting communication of a packet including an encoding of a local area network identifier of a local area network, wherein the encoding of the local area network identifier has a size that is based on the local area network identifier, wherein the encoding of the local area network identifier is based on a set of identifier units. In at least some example embodiments, the set of identifier units includes one or more fixed-sized identifier units. In at least some example embodiments, a number of identifier units in the set of identifier units is based on the local area network identifier. In at least some example embodiments, for each of the identifier units in the set of identifier units, the respective identifier unit includes a first set of bits encoding a respective portion of the local area network identifier and a second set of bits indicative as to whether the respective identifier unit is a final identifier unit in the set of identifier units. In at least some example embodiments, the first set of bits includes seven bits and the second set of bits includes one bit. In at least some example embodiments, each of the identifier units in the set of identifier units has a size of one byte. In at least some example embodiments, the set of identifier units includes at least two identifier units, wherein the local area network identifier is encoded across the at least two identifier units in host byte order. In at least some example embodiments, the encoding of the local area network identifier of the local area network is included within a local area network tag. In at least some example embodiments, the local area network tag includes a tag protocol identifier, a priority code point, and a drop eligible indicator. In at least some example embodiments, the tag protocol identifier is configured to indicate that the packet includes a variable-sized encoding of the local area network identifier. In at least some example embodiments, the means for supporting communication of the packet including the encoding of the local area network identifier of the local area network includes means for receiving an original packet, means for inserting the encoding of the local area network identifier of the local area network within the original packet to form the packet, and means for transmitting the packet including the encoding of the local area network identifier of the local area network. In at least some example embodiments, the means for supporting communication of the packet including the encoding of the local area network identifier of the local area network includes means for receiving the packet including the encoding of the local area network identifier of the local area network, means for removing the encoding of the local area network identifier of the local area network from the packet to form a modified packet, and means for transmitting the modified packet. In at least some example embodiments, the means for supporting communication of the packet including the encoding of the local area network identifier of the local area network includes means for generating, based on the local area network identifier, the encoding of the local area network identifier of the local area network. In at least some example embodiments, the means for generating the encoding of the local area network identifier of the local area network includes means for determining, based on the local area network identifier, a number of identifier units in the set of identifier units to be used to encode the local area network identifier and means for encoding, within the set of identifier units based on the number of identifier units and one or more properties of the set of identifier units, the local area network identifier. In at least some example embodiments, the one or more properties of the set of identifier units includes an identifier unit size of each of the identifier units in the set of identifier units. In at least some example embodiments, the means for generating the encoding of the local area network identifier of the local area network includes means for determining a number of bits n in an available identifier unit available for use in the set of identifier units, means for determining a maximum value supportable by the available identifier unit based on n−1 raised to a power of two, means for determining a number of identifier units for the set of identifier units based on a division of the local area network identifier by the maximum value supportable by the available identifier unit and based on a modulo operation of the local area network identifier by the maximum value supportable by the available identifier unit, means for determining a number of bits for the encoding of the local area network identifier of the local area network based on a multiplication of the number of identifier units for the set of identifier units and the number of bits n in the available identifier unit, means for creating a data structure for the encoding of the local area network identifier of the local area network, wherein the data structure has a size equal to the number of bits for the encoding of the local area network identifier of the local area network, and means for generating the encoding of the local area network identifier of the local area network based on reading of a set of bits of the local area network identifier of the local area network into the data structure. In at least some example embodiments, the encoding of the local area network identifier is a variable-sized encoding. In at least some example embodiments, the local area network includes a virtual local area network. In at least some example embodiments, the virtual local area network is supported based on a bridging network, a provider bridged network, a provider backbone bridged network, a shortest path bridging network, or a network virtualization overlay network.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments for supporting communications for a network (e.g., a local area network (LAN), a virtual LAN (VLAN), or the like) based on use of an identifier of the network are presented. Various example embodiments for supporting communications for a VLAN based on use of a VLAN identifier (VID) of the VLAN are presented. Various example embodiments for supporting communications of a VLAN based on use of a VID of the VLAN may be configured to support use of a variable-sized encoding of the VID (denoted herein as an xVID). Various example embodiments for supporting communications of a VLAN based on use of an xVID for the VLAN may be configured to support use of an xVID that is encoded using a set of fixed-sized identifier units where a number of fixed-sized identifier units used to encode the VID in the xVID is based on the VID (e.g., based on the value of the VID). Various example embodiments for supporting communications of a VLAN based on use of an xVID for the VLAN may be applied within the context of various types of communication networks configured to support communications based on Ethernet networking technologies based on the concept of VLANs. Various example embodiments for supporting communications of a VLAN based on use of an xVID for the VLAN may be applied within the context of various types of communication networks configured to support communications based on VIDs (e.g., bridging networks based on various Institute of Electrical and Electronics Engineers (IEEE) standards such as various IEEE 802 standards or other types of communication networks in which communications based on VIDs may be supported). Various example embodiments for supporting communications of a VLAN based on use of an xVID for the VLAN may be applied within the context of various types of bridging networks in which VIDs may be used (e.g., bridging networks based on IEEE 802.1Q, provider bridged networks (PBNs) based on IEEE 802.1ad, provider backbone bridged networks (PBBNs) based on 802.1ah, shortest path bridging (SPB) networks based on 802.1aq, or the like, as well as various combinations thereof). It will be appreciated that these and various other example embodiments and advantages or potential advantages of supporting communications of a VLAN based on use of an xVID for the VLAN may be further understood by way of reference to the various figures, which are discussed further below.

Figure 1:
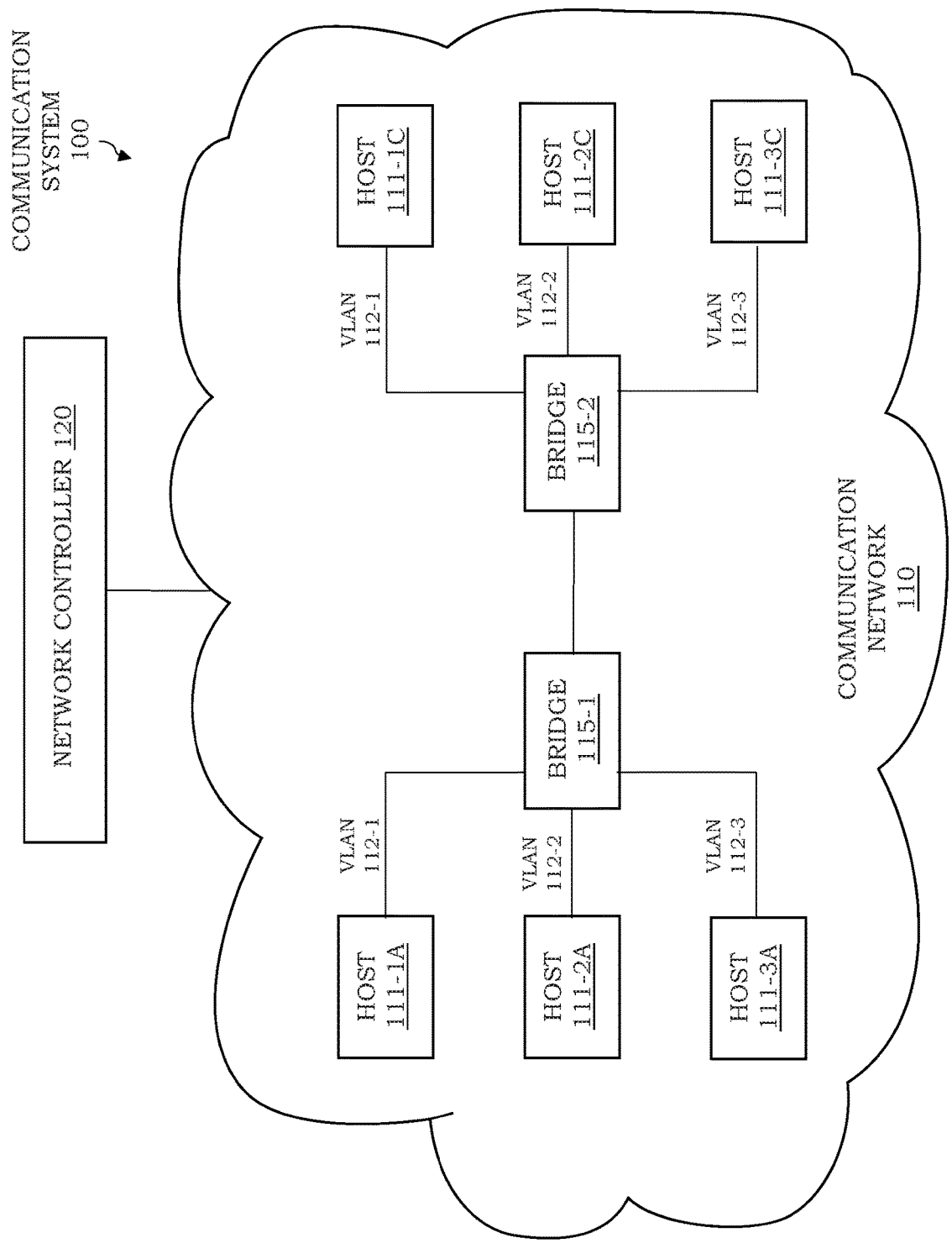
FIG. 1 depicts an example embodiment of a communication system configured to support communications based on use of a variable-sized virtual local area network (VLAN) identifier (xVID)

FIG. 1 depicts an example embodiment of a communication system configured to support communications based on use of a variable-sized virtual local area network (VLAN) identifier (xVID).

The communication system 100 includes a communication network 110 and a network controller 120. The communication network 110 is configured to support communications based on Ethernet networking technology based on the concept of VLANs. The communication network 110 is a bridged network based on IEEE 802.1Q. The communication network 110 is configured to support VAN tagging of Ethernet packets, thereby allowing multiplexing of packets from multiple LANs over shared devices and links as the VLAN tags keep the traffic from the different LANs separated while the traffic from the different LANs traverses the shared devices and links. The network controller 120 is configured to provide various control functions for the communication network 110 (e.g., provisioning, monitoring, management, or the like, as well as various combinations thereof).

The communication network 110 includes a set of hosts 111 configured to communicate using a set of VLANs 112. The hosts 111 include a first pair of hosts 111-1A and 111-1C (collectively, hosts 111-1) associated with a first VLAN 112-1, a second pair of hosts 111-2A and 111-2C (collectively, hosts 111-2) associated with a second VLAN 112-2, and a third pair of hosts 111-3A and 111-3C (collectively, hosts 111-3) associated with a third VLAN 112-3. The VLANs 112 support communications between pairs of the hosts 111 (illustratively, the VLAN 112-1 supports communications between the hosts 111-1A and 111-1C, the VLAN 112-2 supports communications between the hosts 111-2A and 111-2C, and the VLAN 112-3 supports communications between the hosts 111-3A and 111-3C). The hosts 111 are connected via a pair of bridges 115-1 and 115-2 (collectively, bridges 115). The hosts 111-1A, 111-2A, and 111-3A are associated with the bridge 115-1 and the hosts 111-1C, 111-2C, and 111-3C are associated with the bridge 115-2. The link between bridges 115-1 and 115-2, which may be referred to as a trunk link, is shared by the VLANs 112. The VLANs 112-1, 112-2, and 112-3 have VLAN IDs of 10, 20, and 30, respectively. The bridges 115 each maintain Media Access Control (MAC) forwarding tables for each of the VLANs 112 for use in forwarding traffic between the hosts 111 based on the VLANs 112.

The communication network 110 supports communications between the hosts 111 based on the VLANs 112. In the communication network 110, when a packet from LAN x traverses the trunk link between the bridges 115, a VLAN tag is inserted into the packet with VID x, wherein VID x is assigned for LAN x. For example, the following process is performed when the host 111-1A sends a packet to host 111-1C using the VLAN 112-1 which is assumed to have a VLAN ID of 10. The host 111-1A, upon deciding to send a packet to host 111-1C, sends the packet to bridge 115-1 via the access link between host 111-1A and the bridge 115-1. The bridge 115-1, upon receiving the packet from the host 111-1A, learns the source MAC address in the packet and installs the source MAC address in the MAC forwarding table for VLAN 112-1, looks up the destination MAC address of the packet in the MAC forwarding table for the VLAN 112-1, and decides to forward the packet to the bridge 115-2 on the link between the bridge 115-1 and the bridge 115-2. The bridge 115-1 inserts the VLAN tag, including VID 10, into the packet and sends the packet to the bridge 115-2. The bridge 115-2, upon receiving the packet from the bridge 115-1, learns the source MAC address, looks up the destination MAC address, and decides to forward the packet to the host 111-1C via the access link between the bridge 115-2 and the host 111-1C. The bridge 115-2 removes the VLAN tag and forwards the packet to the host 111-1C. As discussed here, the VIDs may be encoded within the headers of the packets using variable-sized encodings (where VIDs encoded using variable-sized encodings may be referred to herein as xVIDs) which may be included within the VLAN tags (where VLAN tags including xVIDs may be referred to herein as xVID tags). It will be appreciated that, although primarily presented with respect to supporting communications based on use of xVIDs within a particular type of communication network (namely, a bridging network that is based on IEEE 802.1Q), various example embodiments for supporting communications based on use of xVIDs may be configured to support communications within various other types of communication networks (e.g., PBNs based on IEEE 802.1ad, PBBNs based on 802.1ah, SPB networks based on 802.1aq, or the like, as well as various combinations thereof).

Figure 2:
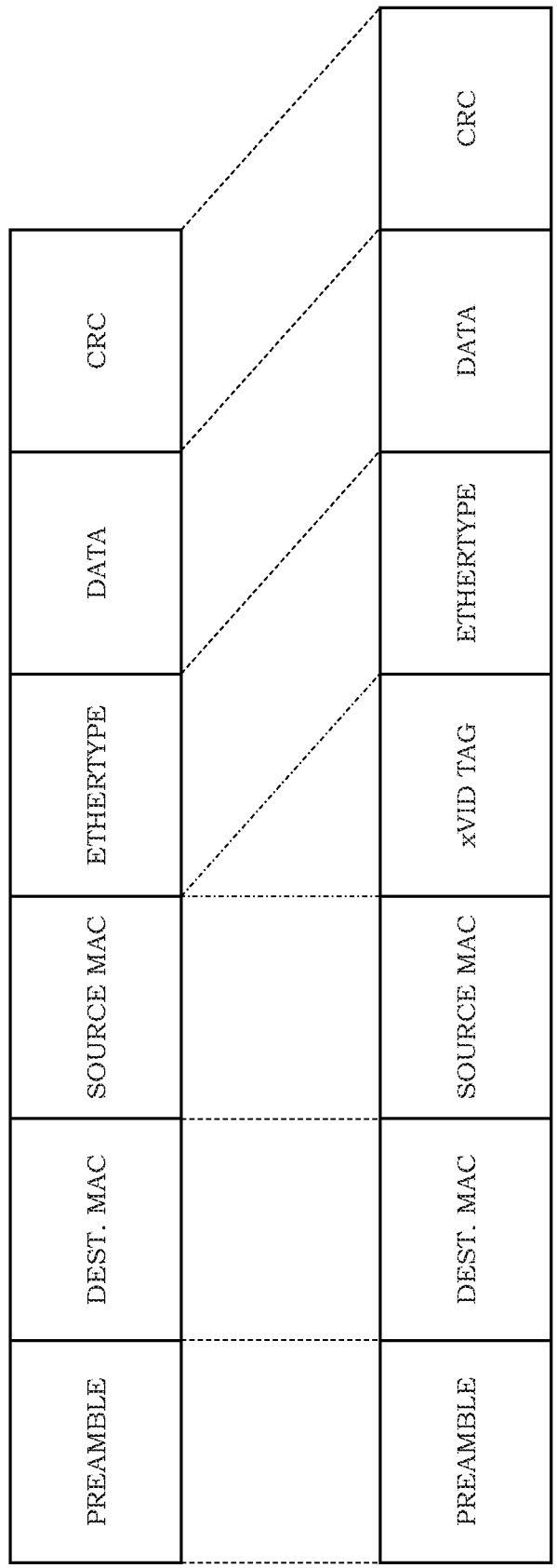
FIG. 2 depicts an example embodiment of an insertion of an xVID tag into an untagged Ethernet frame.

FIG. 2 depicts an example embodiment of an insertion of an xVID tag into an untagged Ethernet frame. It will be appreciated that the insertion of the xVID tag into the untagged Ethernet frame may be performed within the context of bridging network of FIG. 1, where the xVID tag is used in place of an 802.1Q VLAN tag. The untagged Ethernet frame includes a Preamble field, a Destination MAC Address (Dest. MAC) field, a Source MAC Address (Source MAC) field, an Ethertype field, a Data field, and a Cyclic Redundancy Check (CRC) field. A variable-sized xVID tag is inserted within the untagged Ethernet frame, between the Source MAC Address field and the Ethertype field, to form a tagged Ethernet frame. It will be appreciated that the variable-sized xVID tag may be considered to be variable-sized since the sizes of the encodings may vary across encodings of different VIDs. It will be appreciated that, although primarily presented with respect to insertion of an xVID tag in an Ethernet frame (e.g., in place of an 802.1Q VLAN tag) in a bridging network, xVID tags also may be inserted in Ethernet frames in other types of networks (e.g., in place of other types of VLAN tags used in other types of networks). For example, xVID tags may be inserted as the VLAN stacks (e.g., S-VLAN and C-VLAN) in a Q-in-Q frame in a PBN, as the B-VLAN tags in a PBBN, as an overlay network identifier VLAN tag in an NVO, or the like.

Figure 3:
FIG. 3 depicts an example embodiment of an encoding of an xVID tag including an xVID.

FIG. 3 depicts an example embodiment of an encoding of an xVID tag including an xVID.

The xVID tag 300 includes a Tag Protocol Identifier (TPID) field, a Priority Code Point (PCP) field, a Drop Eligibility Indicator (DEI) bit (denoted as D bit), and an xVID field.

The TPID field is a 16-bit field set to a value in order to identify the frame as an xVID tagged frame. This field is located at the same position as the EtherType field in untagged frames and used to, thus, may be used to distinguish the frame from untagged frames. It will be appreciated that any suitable value may be assigned to identify an xVID tagged frame. For example, an xVID tagged frame may be identified using an available value which may be assigned from IEEE-801-IANA (e.g., the value 0x809 or any other suitable value), a custom value, or the like.

The PCP field is a 3-bit field which refers to the class of service and maps to the frame priority level. It will be appreciated that different PCP values can be used to prioritize different classes of traffic.

The DEI field is a 1-bit field which may be used separately from the PCP field or in conjunction with the PCP field to indicate frames eligible to be dropped in the presence of congestion.

The xVID field is a variable length field that encodes the identifier of a VLAN as a chain of N VID units (N≥1). The N VID units encode the VID, providing a variable-sized encoding of the VID in which the number N of VID units used for encoding the VID vary based on the VID. It is noted that a VID unit may include a first set of bits that encodes the VID or portion of the VID and a set of bits that indicates whether the VID unit is the last (Nth) VID unit in the chain of N VID units (e.g., if a VID unit is x bits, the x−1 most significant bits may be used to encode the VID or portion of the VID and the least significant bit may be used to indicate whether the VID unit is the last (Nth) VID unit in the chain of N VID units). It will be appreciated that the VID units may be implemented using various sizes (e.g., 4-bit VID units, 8-bit VID units, 16-bit VID units, or the like). It is noted that an example embodiment of an 8-bit VID unit is presented in FIG. 4.

It will be appreciated that the combination of the PCP field, the DEI field, and the xVID field also may be referred to as tag control information (TCI).

Figure 4:
FIG. 4 depicts an example embodiment of a VID unit configured to support encoding of a VID in an xVID of an xVID tag.

FIG. 4 depicts an example embodiment of a VID unit configured to support encoding of a VID in an xVID of an xVID tag. The VID unit 400 is a 1-octet field. The VID unit 400 includes a Value field and an Indicator field (denoted as N). The Value field is a 7-bit field that carries the VID (where the xVID is encoded using a single VID unit) or a portion of VID (where the xVID is encoded using multiple VID units). The Indicator (N) field is a 1-bit field that indicates whether the VID unit is the last VID unit in the xVID (e.g., if the N bit is set to "1" it means that there is a next VID unit in the xVID and if the N bit is set to "0" it means that the VID unit is the last VID unit in the xVID, or vice versa). It is noted that, when a VID requires multiple VID units to be encoded as an xVID, then the VID may be encoded across the VID units in host byte order (e.g., the first VID unit encodes the least significant bits of the VID and the last VID unit encodes the most significant bits of the VID) or using any other suitable encoding. It will be appreciated that, although primarily presented with respect to an example embodiment in which the VID unit 400 is a one-octet field in which the Value field is a 7-bit field, VID units may use different sizes of the Value field, VID units may have different sizes (which also may influence the size of the Value field of the VID units), or the like, as well as various combinations thereof.

It will be appreciated that the number of VID units which are needed to encode a VID as an xVID will depend on the value of the VID as well as the configuration of the VID units used to encode the xVID. For example, where the VID units are configured as presented with respect to FIG. 4, VIDs with values from 1 to 127 can be encoded using 1 VID unit, VIDs with values from 128 to 16383 can be encoded using 2 VID units, and VIDs with values from 26384 to 2097151 can be encoded using 3 VID units. It will be appreciated that other ranges of VID values may be supported by VID units depending on the configuration of the VID units.

Figure 5:
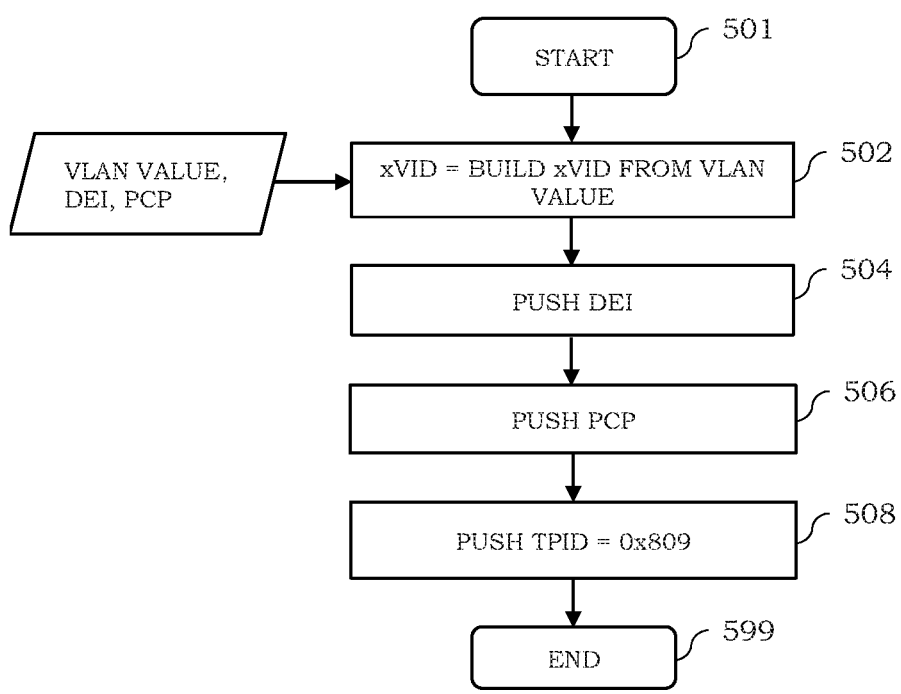
FIG. 5 depicts an example embodiment of a method for encoding an xVID tag for an Ethernet frame.

FIG. 5 depicts an example embodiment of a method for encoding an xVID tag for an Ethernet frame. It will be appreciated that, although primarily presented as being performed serially, at least a portion of the functions of method 500 may be performed contemporaneously or in a different order than as presented with respect to FIG. 5. As depicted in FIG. 5, the inputs to method 500 include the VID (which also may be referred to as the value of the VLAN), the PCP, and the DEI. At block 501, the method 500 begins. Block 502 builds the variable length xVID from the value of the VLAN, and the method 500 then proceeds to block 504. Block 504 pushes the DEI bit atop the xVID, and the method 500 then proceeds to block 506. Block 506 pushes the 3-bits of PCP onto the {DEI, xVID}, and the method 500 then proceeds to block 508. Block 508 pushes the TPID value 0x809 onto {PCP, DEI, xVID} to indicate that the tag is an xVID tag. The resultant frame {TPID=0x809, PCP, DEI, xVID} is the xVID tag. At block 599, the method 500 ends.

Figure 6:
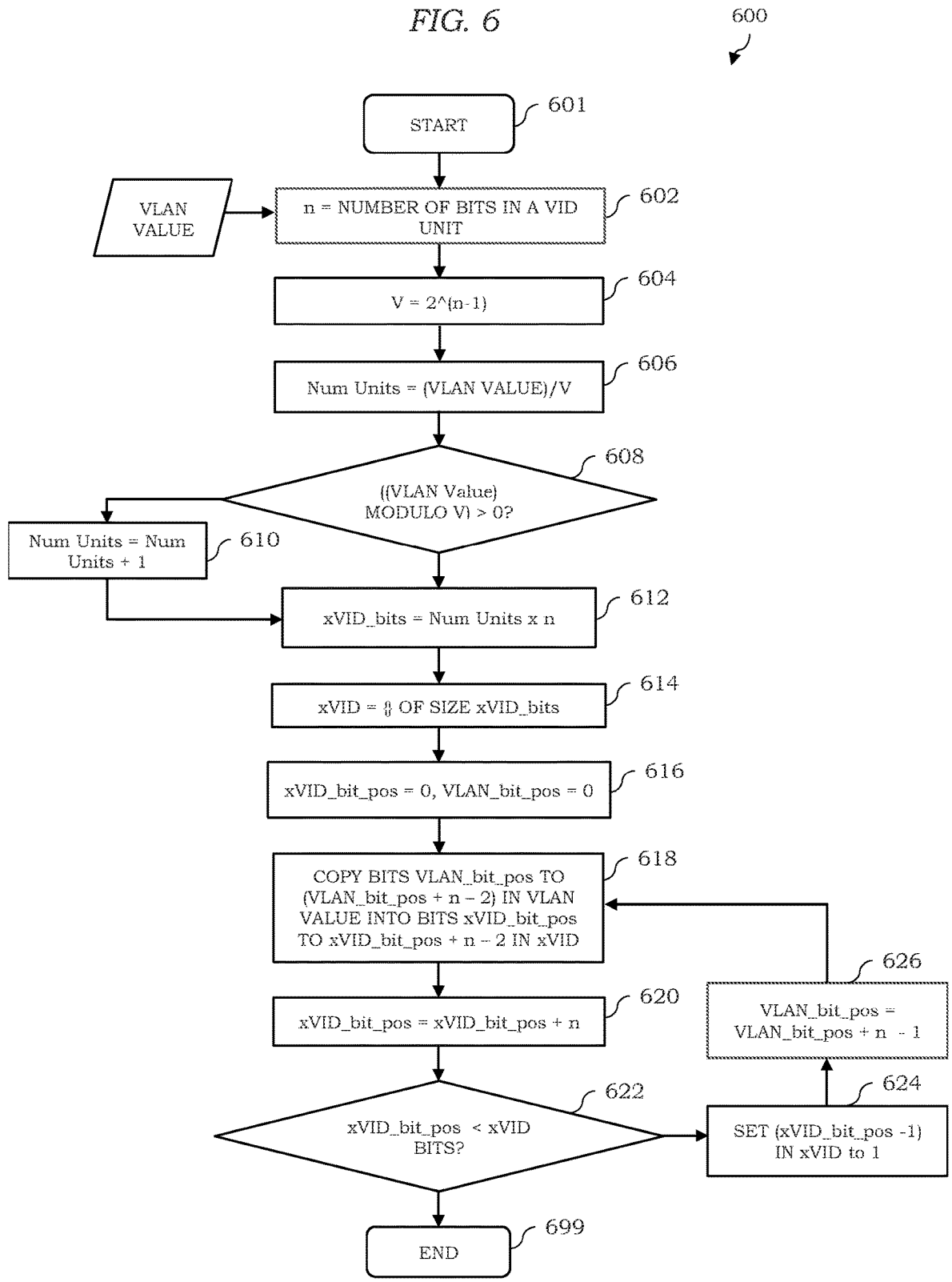
FIG. 6 depicts an example embodiment of a method for building an xVID from a VID value.

FIG. 6 depicts an example embodiment of a method for building an xVID from a VID value. It is noted that the method 600 of FIG. 6 may be used to provide block 502 of the method 500 of FIG. 5. It will be appreciated that, although primarily presented as being performed serially, at least a portion of the functions of method 600 may be performed contemporaneously or in a different order than as presented with respect to FIG. 6. As depicted in FIG. 6, the input to the method 600 includes the VID (which also may be referred to as the value of the VLAN). At block 601, the method 600 begins. Block 602 determines the number of bits (=n) in a VID unit implemented by the bridging devices in the network, and the method 600 then proceeds to block 604. Block 604 determines the maximum attainable value in a VID Unit by raising 2 to the power of (n−1), and the method 600 then proceeds to block 606. Block 606 computes the initial number of VID units required to encode the VLAN, by dividing the VLAN value by maximum attainable value of a VID unit, and the method 600 then proceeds to block 608. Block 608 performs a modulo operation of VLAN value by maximum attainable value of a VID unit and checks if the value is greater than zero. If the value is greater than zero, it means that one additional VID unit is required and, so, the method 600 proceeds to block 610. If the value is not greater than zero, it means that no additional VID units are required and, so, the method 600 proceeds to block 612. Block 610 increments the number of VID units computed by block 606 by one, and the method 600 then proceeds to block 612. Block 612 computes the total number of bits required by xVID (=xVID_bits) by multiplying the number of required VID units with number of bits per VID unit, and the method 600 then proceeds to block 614. Block 614 creates an empty xVID of size xVID_bits, and the method 600 then proceeds to block 616. Block 616 initializes the bit position to start reading from VLAN value (=VLAN_bit_pos) as 0 and the bit position to start storing into xVID (=xVID_bit_pos) as 0, and the method 600 then proceeds to block 618. Block 618 copies the bits VLAN_bit_pos to VLAN_bit_pos+n−2 from VLAN into the bits xVID_bit_pos to xVID_bit_pos+n−2 in xVID. In other words, block 618 copies the (n−1) bits sized value for a VID Unit. The method 600 then proceeds to block 620. Block 620 increments the next bit position to write into xVID (xVID_bit_pos) by n (i.e., to the first bit of next VID Unit). The method 600 then proceeds to block 622. Block 622 checks if the xVID_bit_pos exceeds the total length of xVID (i.e., xVID_bits). If the xVID_bit_pos exceeds the total length of xVID, this means that the xVID is encoded completely and the method 600 proceeds to block 699, where the method 600 ends. If the xVID_bit_pos does not exceed the total length of xVID, this means that the xVID is not encoded completely and the method 600 proceeds to block 624. Block 624 sets the N-bit in the previously encoded VID unit to 1, to indicate that another VID unit starts at the next bit, and the method 600 then proceeds to block 626. Block 626 increments the next bit position to read from VLAN (VLAN_bit_pos) by (n−1) and the method 600 then returns to block 618 to encode the next VID unit into the xVID. At block 699, the method 600 ends.

It will be appreciated that, although primarily presented with respect to building xVIDs from VID values on a per-packet basis (e.g., executing the method 600 of FIG. 6 on a per packet basis), xVIDs may be precomputed for VLANs, stored in memory, and retrieved and pushed into packets of the VLANs as needed (e.g., executing the method 600 of FIG. 6 on a per VLAN basis for precomputing of xVIDs from VID values).

Figure 7:
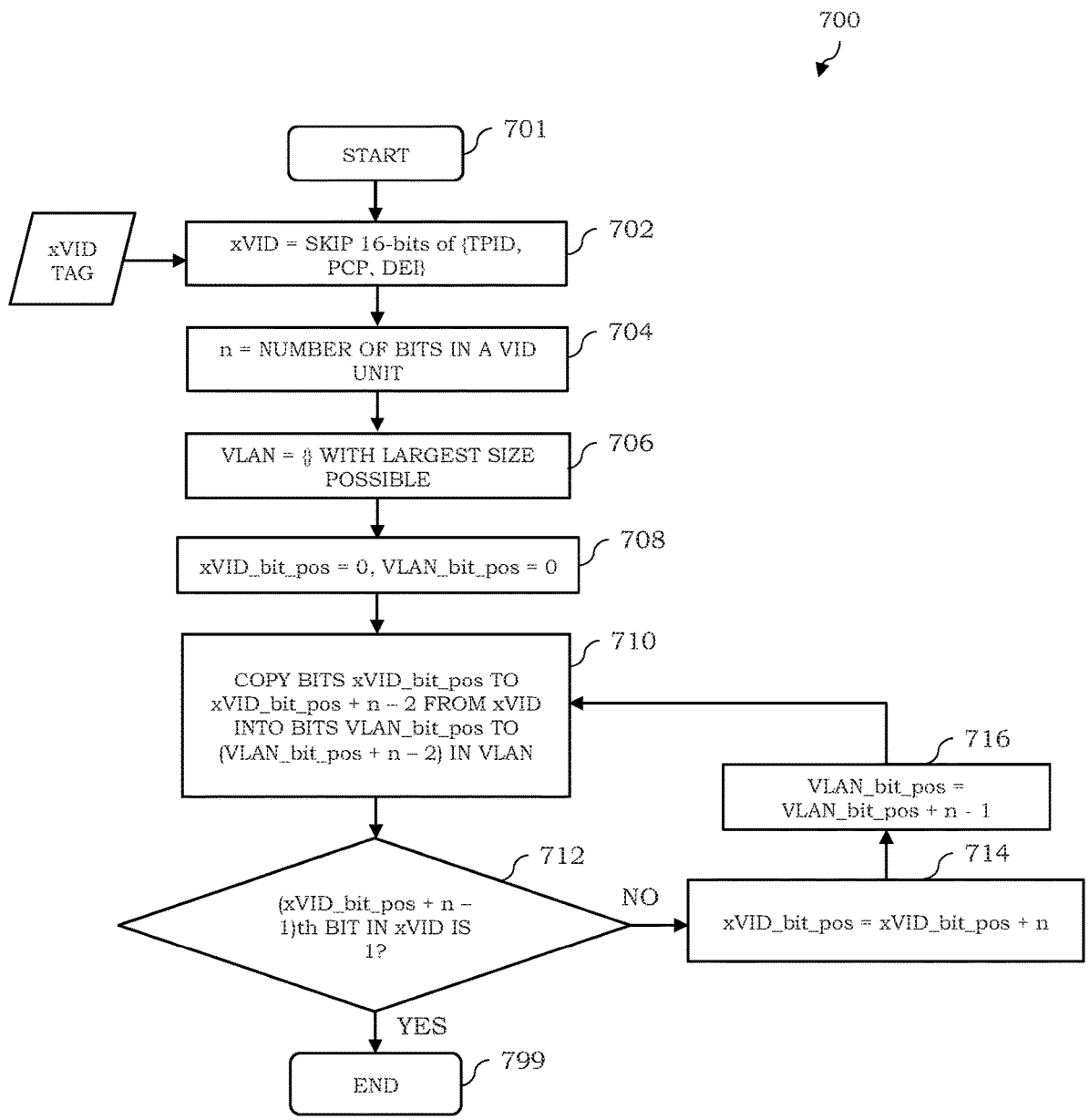
FIG. 7 depicts an example embodiment of a method for retrieving a VID from an xVID tag of an Ethernet frame.

FIG. 7 depicts an example embodiment of a method for retrieving a VID from an xVID tag of an Ethernet frame. It will be appreciated that, although primarily presented as being performed serially, at least a portion of the functions of method 700 may be performed contemporaneously or in a different order than as presented with respect to FIG. 7. It is assumed that, before the method 700 is executed, the bridging device verified that value in the TPID field in the xVID tag is 0x809 or other suitable value that indicates that the VLAN tag is an xVID tag. As depicted in FIG. 7, the input to the method 700 includes an xVID tag including a variable-sized encoding of an xVID for a VLAN. At block 701, the method 700 begins. Block 702 skips the first 16 bits of the xVID tag (i.e., skips the TPID, PCP, and DEI fields to start with the xVID). The method 700 proceeds to block 704. Block 704 determines the number of bits (=n) in a VID Unit implemented by the bridging devices in the network, and the method then proceeds to block 706. Block 706 initializes an empty VLAN value with the size to accommodate the largest value possible in the network, and the method 700 then proceeds to block 708. Block 708 initializes the bit position to start writing to the VLAN value (=VLAN_bit_pos) as 0 and the bit position to start reading from xVID (=xVID_bit_pos) as 0, and the method 700 then proceeds to block 710. Block 710 copies the bits xVID_bit_pos to xVID_bit_pos+n−2 from xVID into bits VLAN_bit_pos to VLAN_bit_pos+n−2 of VLAN. In other words, block 710 copies the (n−1) bits sized value of a VID Unit from xVID into VLAN, and the method 700 then proceeds to block 712. Block 712 checks if the N-bit field in VID unit is 1. It is noted that the N-bit field in the VID unit is the (xVID_bit_pos+n−1)th bit in xVID. If the N-bit field in the VID unit is not set to 1, then it means the last VID Unit has been read out and VLAN value is completely retrieved, so the method 700 proceeds to block 799, where the method 700 ends. If the N-bit field in VID unit is set to 1, then there are more VID Units to read and the method 700 proceeds to block 714. Block 714 sets the next bit position to read from xVID by incrementing xVID_bit_pos by n, which is the starting bit for next VID unit, and the method 700 then proceeds to block 716. Block 716 sets the next bit position to write into VLAN by incrementing VLAN_bit_pos by (n−1), and the method 700 then returns to block 710 to read the next VID unit into VLAN value. At block 799, the method 700 ends.

It will be appreciated that, although primarily presented with respect to supporting communications based on use of xVIDs within a particular type of communication network (namely, a bridging network that is based on IEEE 802.1Q), various example embodiments for supporting communications based on use of xVIDs may be configured to support communications within various other types of communication networks (e.g., PBNs based on IEEE 802.1ad, PBBNs based on 802.1ah, SPB networks based on 802.1aq, or the like, as well as various combinations thereof).

It will be appreciated that, although primarily presented with respect to supporting communications based on use of xVIDs within a bridging network that is based on IEEE 802.1Q, various example embodiments for supporting communications based on use of xVIDs may be configured to support communications within PBNs based on IEEE 802.1ad. This is also known as Q-in-Q tagging, where Q-in-Q refers to doubling up of 802.1Q tags, as well as VLAN stacking or double tagging. This capability enables PBNs by service providers (SPs) to offer transparent LAN services that preserve and extend the virtual LAN groupings of customers across a metro area network (MAN) or wide area network (WAN). Q-in-Q tagging enables an SP to use a single VLAN to securely transport most or all of the VLANs of a single customer across their MAN or WAN backbone. In this case, the SP edge switch adds an extra 802.1Q header to customer traffic. This tag assigns a unique VID number to each customer to keep the VLAN traffic of the different customers separated and private. Thus, a single SP VLAN (S-VLAN) can carry traffic for a set of customer VLANs (C-VLANs). It will be appreciated that use of xVIDs in such a PBN enables an SP to support more than 4094 customers per service instance.

It will be appreciated that, although primarily presented with respect to supporting communications based on use of xVIDs within a bridging network that is based on IEEE 802.1Q, various example embodiments for supporting communications based on use of xVIDs may be configured to support communications within PBBNs based on IEEE 802.1ah. This is also known as MAC-in-MAC and may be used by SPs to resolve various limitations associated with PBNs based on IEEE 802.1ad. PBB introduces a hierarchical network architecture with associated new frame formats which extend the work completed by provider bridges. In the PBB architecture, customer networks (using 802.1q bridging) are aggregated into provider bridged networks (using 802.1ad). These, in turn, are aggregated into PBB networks which utilize the 802.1ah frame format. The frame format employs a MAC tunneling encapsulation scheme for tunneling customer Ethernet frames within provider Ethernet frames across the PBBN. In a PBBN, backbone Ethernet bridges (BEBs) may be entry points to the PBBN and may encapsulate customer Ethernet frames with backbone Ethernet header (thus MAC-in-MAC). The customer Ethernet frame may be an 802.1ad frame from a PBN. The source MAC address and the destination MAC address in the backbone Ethernet header are the MAC address of the source BEB (also referred to as the B-SA MAC alias backbone source address) and the MAC address of the destination BEB (also referred to as the B-DA MAC alias backbone destination address), respectively. In a PBBN, a VLAN (which typically is referred to as a Backbone VLAN (B-VLAN)) has an associated VID that may be used to separate the backbone into broadcast domains and a service identifier (I-SID or I-tag) is defined and used to associate a given customer Ethernet frame with a provider service instance. BEBs maintain customer specific MAC forwarding tables, learning customer source MAC addresses from the customer frames received from the PBN and customer source address to backbone source address associations from the MAC-in-MAC frames received from other BEBs. The bridges within the PBBN (typically referred to as Backbone Core Bridges (BCBs)) are regular 802.1q based bridges which forward frames between BEBs based on the backbone Ethernet header alone and are completely agnostic as to the customer Ethernet frame as well as the T-SID. So, PBBNs provide a clear separation between I-SIDs and B-VLANs which was missing in IEEE 802.1ad PBNs. It is noted that one or more S-VLANs in a PBN may be treated as a single instance of a MAC service. The BEBs extend the S-VLANs over the backbone by mapping all frames on a single backbone service instance identified by an I-SID. The I-SID that is used is provisioned by the provider of the PBBN. The BEBs preserve the S-VLANs over the backbone by mapping onto the I-SID and, in the case of S-VLAN bundling, carrying the S-VLAN ID. This operation is performed by the provider operating the PBBN by configuring the I-SID on each BEB attached to a PBN. The BEB maps the S-VLAN ID to the I-SID and encapsulates the original service frame with a new I-TAG, B-SA, and B-DA. The BEB then maps the frame onto a B-VLAN, which interconnects BEBs. This new frame is transmitted over the B-VLAN by BEBs and BCBs that carry the B-VLAN. Since the initial octets of the data conveyed in each backbone frame comprise a B-VLAN ID, the frames may be forwarded by BCBs of the PBBN on the B-VLAN ID, until they reach the next BEB where the frames are decapsulated. During decapsulation, the B-DA, B-SA, B-TAG, and I-TAG are stripped. The C-DA and C-SA from the I-TAG will become the DA and SA transmitted to the receiving S-VLAN. So, after decapsulation the resultant frame is an 802.1ad frame which is forwarded to the respective PBN. It will be appreciated that PBBNs may have the following benefits: (1) imposing no change to the Ethernet switching process in the core bridges, (2) providing a clear demarcation point between the customer and the provider domain, (3) learning customer MAC addresses through the BEBs, and (4) supporting up to $2^{24}$ service instances. It will be appreciated that use of xVIDs in such a PBBN enables scaling of the number of B-VLANs beyond 4096, whereas, with traditional VIDs, B-VLANs typically are limited to 4096. Additionally, it offers compression of header overhead for VLAN values in the range of 0-127 (if each VID unit is of size 8-bits).

It will be appreciated that, although primarily presented with respect to supporting communications based on use of xVIDs within a bridging network that is based on IEEE 802.1Q, various example embodiments for supporting communications based on use of xVIDs may be configured to support communications within SPB networks based on IEEE 802.1aq. In order to circumvent Spanning Tree Protocol (STP) limitations in PBBN, SPB was developed as an alternative topology discovery technology for PB and PBB networks. SPB eliminates STP and its variants. STP blocked any redundant paths that could result in a loop, whereas SPB allows all paths to be active with multiple equal cost paths, provides much larger layer Ethernet topologies, supports faster convergence times, and improves the efficiency by allowing traffic to load share across all paths of a mesh network. The technology provides logical Ethernet networks on native Ethernet infrastructures using a link state protocol to advertise both topology and logical network membership. The control plane is based on the Intermediate System to Intermediate System (IS-IS) routing protocol. SPB is similar to Interior Gateway Protocol (IGP)-based IP networks (e.g., based on IGPs such as IS-IS, Open Shortest Path First (OSPF), OSPF Version 3 (OSPFv3), or the like), but in Ethernet networks. So, in SPB, bridges are not self-learning bridges, but they build the MAC forwarding table based on the topology database built by link state protocols. Each bridge computes the paths to all external MAC addresses in the topology database by using a Shortest Path First (SPF) algorithm and installs the entries in the MAC forwarding table. Bridges may flood topology information across the network by using IS-IS as the link state protocol. As a result, identical topology databases are built by each bridge. Based on the topology database, each bridge independently computes the shortest path to every other known destination MAC address and installs an entry in the MAC forwarding table. The SPB provides shortest path routing based on B-DA MAC addresses. It will be appreciated that use of xVIDs in such an SPB network based on IEEE 802.1aq enables the number of SPB instances, where each instance is identified by a VLAN, to extend beyond 4096, whereas, with traditional VIDs, only up to 4096 VLANs typically are supported. Additionally, it offers compression of header overhead for VLAN values in the range of 0-127 (if each VID unit is of size 8 bits).

It will be appreciated that, although primarily presented with respect to supporting communications based on use of xVIDs within a bridging network that is based on IEEE 802.1Q, various example embodiments for supporting communications based on use of xVIDs may be configured to support communications within Ethernet network virtualization overlays (NVOs). An NVO provides transparent connectivity between remote sites of a LAN across an IP network. A site of a LAN is directly connected to an edge router. An edge router tunnels the Ethernet frames from the local site of each LAN to another edge router based on an IP based tunneling mechanism. NVOs are particularly useful in multi-tenant data centers (DCs) that provide distributed computational infrastructure for multiple customers (tenants). Each customer is assigned an independent LAN, which is a service instance for the NVO. The NVO aggregates multiple LANs over the IP tunnel, so it needs a service specific tag/encapsulation as identifier for each LAN. The default choice for service encapsulation may be a VID; however, since the number of VLANs are limited to 4094 and a DC needs to host more than 4094 customers, non-Ethernet based encapsulations have been developed to multiplex service instances on an NVO. One type of NVO solution is a Virtual Extensible LAN (VXLAN), wherein a unique 24-bit virtual network identifier (VNI) is assigned to identify a service instance (LAN), the VNI is encoded in a VXLAN Header pushed atop the Ethernet packet, the VXLAN packet is encapsulated by UDP and IP headers, and the resultant packet is tunneled across the IP network based on the IP header. Another type of NVO solution is Network Virtualization Generic Routing Encapsulation (NVGRE), wherein a unique 24-bit virtual subnet identifier (VSID) is assigned to identify a service instance (LAN), the VSID is encoded in an NVGRE Header pushed atop the Ethernet packet, the NVGRE packet is encapsulated by an IP header, and the resultant packet is tunneled across the IP network based on the IP header. Another type of NVO solution is Generic Network Virtualization Encapsulation (GENEVE), wherein a unique 24-bit virtual network identifier (VNI) is assigned to identify a service instance (LAN), the VNI is encoded in a GENEVE Header pushed atop the Ethernet packet, the GENEVE packet is encapsulated by UDP and IP headers, and the resultant packet is tunneled across the IP network based on the IP header. Another type of NVO solution is MPLS-in-IP, wherein a unique MPLS label is assigned to identify a service instance (LAN) and the labeled Ethernet packet is encapsulated by an IP header that is used to tunnel the labeled Ethernet packet across the IP network. Another type of NVO solution is MPLS-in-GRE, wherein a unique MPLS label is assigned to identify a service instance (LAN), the labeled Ethernet packet is encapsulated by GRE and IP headers, and the resultant packet is tunneled across the network based on the IP header. Another type of NVO solution is MPLS-in-UDP, wherein a unique MPLS label is assigned to identify a service instance (LAN), the labeled Ethernet packet is encapsulated by UDP and IP headers, and the resultant packet is tunneled across IP network based on IP header. Since xVID allows for scaling to any number of VLANs, rather than relying on complex NVO technologies, NVO can be simplified by assigning an xVID to each NVO instance (tenant) and then natively tunneling Ethernet packets over IP tunnels, where Ethernet packets of each NVO instance (tenant) added its assigned xVID tag.

It will be appreciated that, although primarily presented with respect to supporting communications based on use of xVIDs within a particular type of communication network (namely, a bridging network that is based on IEEE 802.1Q), various example embodiments for supporting communications based on use of xVIDs may be configured to support communications within various other types of communication networks.

Various example embodiments for supporting communications based on use of xVIDs may provide various advantages or potential advantages. For example, various example embodiments for supporting communications based on use of xVIDs may enable VIDs to be encoded using less bits than might otherwise be possible without use of xVIDs, thereby conserving bandwidth within networks. For example, various example embodiments for supporting communications based on use of xVIDs may enable support for a larger number of VIDs than might otherwise be possible without use of xVIDs, thereby enabling support for a larger number of VLANs within networks. For example, various example embodiments for supporting communications based on use of xVIDs within bridging networks may support more than 4094 VLANs. Similarly, for example, various example embodiments for supporting communications based on use of xVIDs within PBNs may support more than 4094 VLANs. Various example embodiments for supporting communications based on use of xVIDs may enable simplification of Ethernet technologies (e.g., overcoming various problems rooted in the limitation of 4094 VLANs which may be supported by a fixed-sized 12-bit encoding of a VID) in various communications contexts (e.g., in data center networks such as WebScale networks, in metro Ethernet networks (MENs), or the like). Various example embodiments for supporting communications based on use of xVIDs may enable simple and efficient variable-sized encoding of VIDs with relatively high levels of compression (e.g., by obviating a need to use a Type-Length-Value (TLV) format to encode the VID, obviating a need to use a combination of Type and Length fields to encode the VID, obviating a need to define multiple Types for different sized VIDs, and so forth). Various example embodiments for supporting communications based on use of xVIDs may provide various other advantages or potential advantages.

It will be appreciated that, although primarily presented with respect to supporting communications based on use of variable-sized encodings of particular types of identifiers within particular types of communication networks (namely, VIDs within various types of VLANs or VLAN related networks), various example embodiments for supporting communications based on use of variable-sized encodings may be configured to support communications within various other types of communication networks (e.g., physical LANs, VLANs, LAN-like networks, or the like, as well as various combinations thereof).

Figure 8:
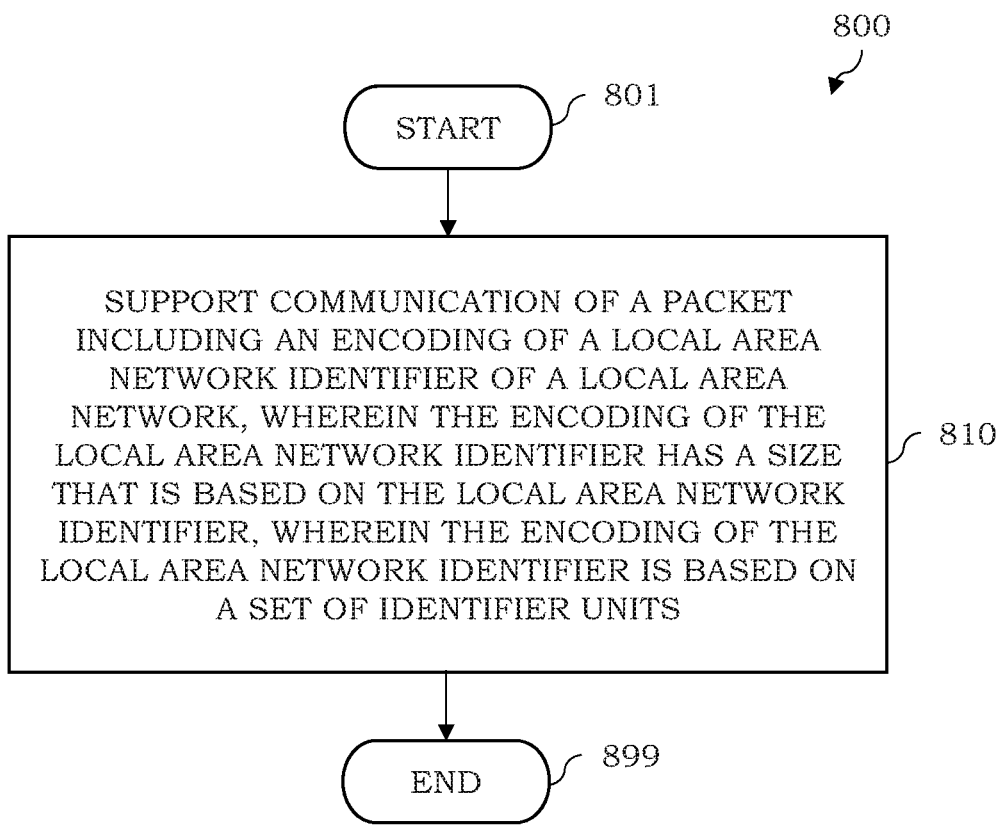
FIG. 8 depicts an example embodiment of a method for supporting communications based on a variable-sized encoding of a local area network identifier.

FIG. 8 depicts an example embodiment of a method for supporting communications based on a variable-sized encoding of a local area network identifier. It will be appreciated that, although primarily presented as being performed serially, at least a portion of the functions of method 800 may be performed contemporaneously or in a different order than as presented with respect to FIG. 8. At block 801, the method 800 begins. At block 810, support communication of a packet including an encoding of a local area network identifier of a local area network, wherein the encoding of the local area network identifier has a size that is based on the local area network identifier, wherein the encoding of the local area network identifier is based on a set of identifier units. The set of identifier units may include one or more fixed-sized identifier units. The number of identifier units in the set of identifier units may be based on the local area network identifier. The identifier units in the set of identifier units each may include a first set of bits encoding a respective portion of the local area network identifier and a second set of bits indicative as to whether the respective identifier unit is a final identifier unit in the set of identifier units. The first set of bits may include seven bits and the second set of bits may include one bit. The identifier units in the set of identifier units each may include one byte. The set of identifier units may include at least two identifier units, and the local area network identifier may be encoded across the at least two identifier units in host byte order. The encoding of the local area network identifier of the local area network may be included within a local area network tag. The local area network tag may include a tag protocol identifier, a priority code point, and a drop eligible indicator. The tag protocol identifier may be configured to indicate that the packet includes a variable-sized encoding of the local area network identifier. The support for communication of the packet including the encoding of the local area network identifier of the local area network may include receiving an original packet, insert the encoding of the local area network identifier of the local area network within the original packet to form the packet, and transmitting the packet including the encoding of the local area network identifier of the local area network. The support for communication of the packet including the encoding of the local area network identifier of the local area network may include receiving the packet including the encoding of the local area network identifier of the local area network, removing the encoding of the local area network identifier of the local area network from the packet to form a modified packet, and transmitting the modified packet. The support for communication of the packet including the encoding of the local area network identifier of the local area network may include generating, based on the local area network identifier, the encoding of the local area network identifier of the local area network. The generating of the encoding of the local area network identifier of the local area network may include determining, based on the local area network identifier, a number of identifier units in the set of identifier units to be used to encode the local area network identifier and encoding, within the set of identifier units based on the number of identifier units and one or more properties of the set of identifier units, the local area network identifier. The one or more properties of the set of identifier units may include an identifier unit size of each of the identifier units in the set of identifier units. The generating of the encoding of the local area network identifier of the local area network may include determining a number of bits n in an available identifier unit available for use in the set of identifier units, determining a maximum value supportable by the available identifier unit based on n−1 raised to a power of two, determining a number of identifier units for the set of identifier units based on a division of the local area network identifier by the maximum value supportable by the available identifier unit and based on a modulo operation of the local area network identifier by the maximum value supportable by the available identifier unit, determining a number of bits for the encoding of the local area network identifier of the local area network based on a multiplication of the number of identifier units for the set of identifier units and the number of bits n in the available identifier unit, creating a data structure for the encoding of the local area network identifier of the local area network, wherein the data structure has a size equal to the number of bits for the encoding of the local area network identifier of the local area network, and generating the encoding of the local area network identifier of the local area network based on reading of a set of bits of the local area network identifier of the local area network into the data structure. The encoding of the local area network identifier is a variable-sized encoding. The local area network may be a virtual local area network. The virtual local area network may be supported based on a bridging network, a provider bridged network, a provider backbone bridged network, a shortest path bridging network, or a network virtualization overlay network. At block 899, the method 800 ends.

It will be appreciated that, although primarily presented with respect to supporting communications based on use of variable-sized encodings of particular types of identifiers within particular types of communication networks (namely, network identifiers within LANs), various example embodiments for supporting communications based on use of variable-sized encodings may be configured to support communications based on use of variable-sized encodings of various other types of identifiers within various other types of communication networks.

Figure 9:
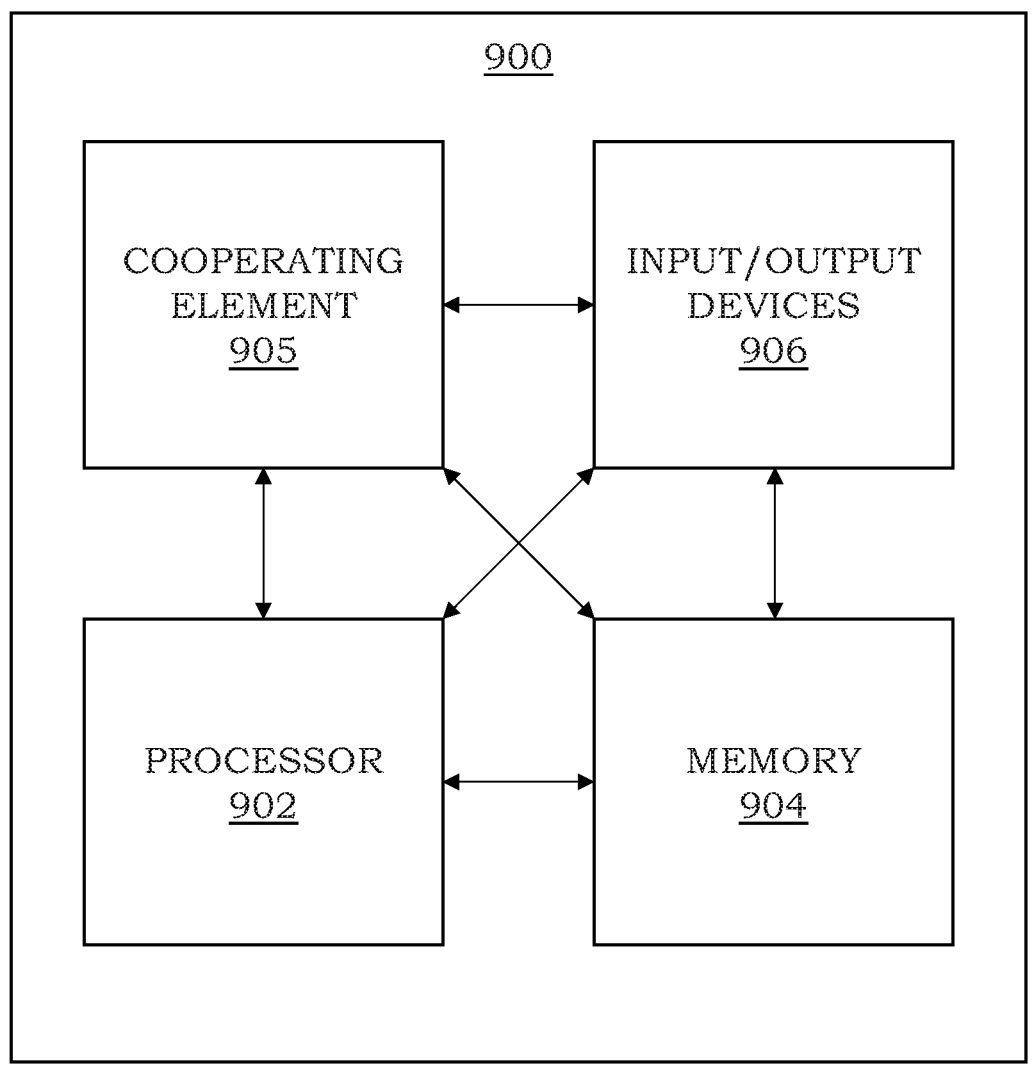
FIG. 9 depicts an example embodiment of a computer suitable for use in performing various functions presented herein.

FIG. 9 depicts an example embodiment of a computer suitable for use in performing various functions presented herein.

The computer 900 includes a processor 902 (e.g., a central processing unit (CPU), a processor, a processor having a set of processor cores, a processor core of a processor, or the like) and a memory 904 (e.g., a random access memory, a read only memory, or the like). The processor 902 and the memory 904 may be communicatively connected. In at least some example embodiments, the computer 900 may include at least one processor and at least one memory including a set of instructions which, when executed by the at least one processor, cause the computer 900 to perform various functions presented herein.

The computer 900 also may include a cooperating element 905. The cooperating element 905 may be a hardware device. The cooperating element 905 may be a process that can be loaded into the memory 904 and executed by the processor 902 to implement various functions presented herein (in which case, for example, the cooperating element 905 (including associated data structures) can be stored on a non-transitory computer-readable storage medium, such as a storage device or other suitable type of storage element (e.g., a magnetic drive, an optical drive, or the like)).

The computer 900 also may include one or more input/output devices 906. The input/output devices 906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 900 may represent a general architecture and functionality suitable for implementing functional elements described herein, portions of functional elements described herein, or the like, as well as various combinations thereof. For example, computer 900 may provide a general architecture and functionality that is suitable for implementing one or more elements presented herein, such as network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including a set of instructions;
   wherein the set of instructions is configured to, when executed by the at least one processor, cause the apparatus to:
      support communication of a packet including an encoding of a virtual local area network identifier of a virtual local area network, wherein the encoding of the virtual local area network identifier has a size that is based on the virtual local area network identifier, wherein the encoding of the virtual local area network identifier is based on a set of identifier units, wherein a number of identifier units in the set of identifier units is based on the virtual local area network identifier.

2. The apparatus of claim 1, wherein the set of identifier units includes one or more fixed-sized identifier units.

3. The apparatus of claim 1, wherein the identifier units in the set of identifier units encode respective portions of the virtual local area network identifier.

4. The apparatus of claim 1, wherein, for each of the identifier units in the set of identifier units, the respective identifier unit includes a first set of bits encoding a respective portion of the virtual local area network identifier and a second set of bits indicative as to whether the respective identifier unit is a final identifier unit in the set of identifier units.

5. The apparatus of claim 4, wherein the first set of bits includes seven bits and the second set of bits includes one bit.

6. The apparatus of claim 1, wherein each of the identifier units in the set of identifier units has a size of one byte.

7. The apparatus of claim 1, wherein the set of identifier units includes at least two identifier units, wherein the virtual local area network identifier is encoded across the at least two identifier units in host byte order.

8. The apparatus of claim 1, wherein the encoding of the virtual local area network identifier of the local area network is included within a virtual local area network tag.

9. The apparatus of claim 8, wherein the virtual local area network tag includes a tag protocol identifier, a priority code point, and a drop eligible indicator.

10. The apparatus of claim 9, wherein the tag protocol identifier is configured to indicate that the virtual local area network identifier is encoded using the set of identifier units.

11. The apparatus of claim 1, wherein, to support communication of the packet, the set of instructions is configured to, when executed by the at least one processor, cause the apparatus to:
    receive an original packet;
    insert the encoding of the virtual local area network identifier of the virtual local area network within the original packet to form the packet; and
    transmit the packet including the encoding of the virtual local area network identifier of the virtual local area network.

12. The apparatus of claim 1, wherein, to support communication of the packet, the set of instructions is configured to, when executed by the at least one processor, cause the apparatus to:
- receive the packet including the encoding of the virtual local area network identifier of the virtual local area network;
- remove the encoding of the virtual local area network identifier of the virtual local area network from the packet to form a modified packet; and
- transmit the modified packet.

13. The apparatus of claim 1, wherein, to support communication of the packet, the set of instructions is configured to, when executed by the at least one processor, cause the apparatus to:
- generate, based on the virtual local area network identifier, the encoding of the virtual local area network identifier of the virtual local area network.

14. The apparatus of claim 13, wherein, to generate the encoding of the virtual local area network identifier of the virtual local area network, the set of instructions is configured to, when executed by the at least one processor, cause the apparatus to:
- determine, based on the virtual local area network identifier, a number of identifier units in the set of identifier units to be used to encode the virtual local area network identifier; and
- encode, within the set of identifier units based on the number of identifier units and one or more properties of the set of identifier units, the virtual local area network identifier.

15. The apparatus of claim 14, wherein the one or more properties of the set of identifier units includes an identifier unit size of each of the identifier units in the set of identifier units.

16. The apparatus of claim 13, wherein, to generate the encoding of the virtual local area network identifier of the virtual local area network, the set of instructions is configured to, when executed by the at least one processor, cause the apparatus to:
- determine a number of bits n in an available identifier unit available for use in the set of identifier units;
- determine a maximum value supportable by the available identifier unit based on n−1 raised to a power of two;
- determine a number of identifier units for the set of identifier units based on a division of the virtual local area network identifier by the maximum value supportable by the available identifier unit and based on a modulo operation of the virtual local area network identifier by the maximum value supportable by the available identifier unit;
- determine a number of bits for the encoding of the virtual local area network identifier of the virtual local area network based on a multiplication of the number of identifier units for the set of identifier units and the number of bits n in the available identifier unit;
- create a data structure for the encoding of the virtual local area network identifier of the virtual local area network, wherein the data structure has a size equal to the number of bits for the encoding of the virtual local area network identifier of the virtual local area network; and
- generate the encoding of the virtual local area network identifier of the virtual local area network based on reading of a set of bits of the virtual local area network identifier of the virtual local area network into the data structure.

17. The apparatus of claim 1, wherein the encoding of the virtual local area network identifier is a variable-sized encoding.

18. The apparatus of claim 1, wherein the virtual local area network is supported based on a bridging network, a provider bridged network, a provider backbone bridged network, a shortest path bridging network, or a network virtualization overlay network.

19. A method, comprising:
- supporting communication of a packet including an encoding of a virtual local area network identifier of a virtual local area network, wherein the encoding of the virtual local area network identifier has a size that is based on the virtual local area network identifier, wherein the encoding of the virtual local area network identifier is based on a set of identifier units, wherein a number of identifier units in the set of identifier units is based on the virtual local area network identifier.

20. An apparatus, comprising:
- at least one processor; and
- at least one memory storing a set of instructions that, when executed by the at least one processor, cause the apparatus to:
  - support communication of a packet including a virtual local area network tag encoding a virtual local area network identifier of a virtual local area network, wherein the virtual local area network tag encodes the virtual local area network identifier using a set of identifier units, wherein a number of identifier units in the set of identifier units that encodes the virtual local area network identifier is based on the virtual local area network identifier.

* * * * *